US012792062B2

(12) United States Patent
Yu

(10) Patent No.: US 12,792,062 B2
(45) Date of Patent: Nov. 10, 2026

(54) GOODS DELIVERY METHOD AND APPARATUS, AND SERVER

(71) Applicant: HAI ROBOTICS CO., LTD., Shenzhen (CN)

(72) Inventor: Runfang Yu, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 134 days.

(21) Appl. No.: 18/809,205

(22) Filed: Aug. 19, 2024

(65) Prior Publication Data

US 2024/0411325 A1 Dec. 12, 2024

Related U.S. Application Data

(63) Continuation of application No. PCT/CN2023/076440, filed on Feb. 16, 2023.

(30) Foreign Application Priority Data

Mar. 15, 2022 (CN) ........................ 202210252695.7

(51) Int. Cl.
*G05D 1/667* (2024.01)
*G05D 1/69* (2024.01)
(Continued)

(52) U.S. Cl.
CPC ............... *G05D 1/667* (2024.01); *G05D 1/69* (2024.01); *G06Q 10/087* (2013.01); *G05D 2105/20* (2024.01); *G05D 2107/70* (2024.01)

(58) Field of Classification Search
CPC ...... G05D 1/667; G05D 1/69; G05D 2107/70; G05D 2105/20; G06Q 10/087
See application file for complete search history.

(56) References Cited

U.S. PATENT DOCUMENTS

| | | | | |
|---|---|---|---|---|
| 9,741,010 | B1 * | 8/2017 | Heinla | G06Q 10/083 |
| 10,572,854 | B2 * | 2/2020 | Johnson | G06Q 10/0835 |

(Continued)

FOREIGN PATENT DOCUMENTS

| | | |
|---|---|---|
| CN | 107977763 A | 5/2018 |
| CN | 109118137 A | 1/2019 |

(Continued)

OTHER PUBLICATIONS

International Search Report in International Application No. PCT/CN2023/076440, mailed Mar. 22, 2023.

(Continued)

*Primary Examiner* — Ramsey Refai
(74) *Attorney, Agent, or Firm* — Ladas & Parry, LLP

(57) ABSTRACT

The present disclosure provides a goods delivery method and apparatus, and a server. The method includes: obtaining delivery requirements of a plurality of delivery points in a delivery task; grouping the plurality of delivery points into at least one delivery point group according to the delivery requirements of the delivery points and a delivery capacity of a robot; determining a target delivery route corresponding to one delivery point group in the at least one delivery point group; and controlling, according to the target delivery route, a first robot to deliver goods corresponding to the one delivery point group in the delivery task to the delivery points in the one delivery point group. Through the method, a multi-bin robot can be controlled to complete delivery of goods in a lineside warehouse, and a process of delivery by the multi-bin robot can be optimized, thereby improving delivery efficiency.

14 Claims, 5 Drawing Sheets

(51) Int. Cl.

| | |
|---|---|
| ***G06Q 10/087*** | (2023.01) |
| *G05D 105/20* | (2024.01) |
| *G05D 107/70* | (2024.01) |

(56) References Cited

U.S. PATENT DOCUMENTS

| | | | | |
|---|---|---|---|---|
| 12,493,852 | B2 * | 12/2025 | Jacquemart .......... | G05D 1/0297 |
| 2016/0101940 | A1 * | 4/2016 | Grinnell ................. | B25J 9/1679 700/218 |
| 2019/0095854 | A1 * | 3/2019 | Pandya ................ | B65G 1/0492 |
| 2023/0259878 | A1 * | 8/2023 | Jacquemart .......... | G05D 1/0297 705/28 |

FOREIGN PATENT DOCUMENTS

| | | | |
|---|---|---|---|
| CN | 111126688 | A | 5/2020 |
| CN | 111796596 | A | 10/2020 |
| CN | 113011659 | A | 6/2021 |
| CN | 113240175 | A | 8/2021 |
| CN | 113269424 | A | 8/2021 |
| CN | 113283834 | A | 8/2021 |
| CN | 113298467 | A | 8/2021 |
| CN | 113592408 | A | 11/2021 |
| CN | 114596035 | A | 6/2022 |
| WO | 2020233227 | A1 | 11/2020 |

OTHER PUBLICATIONS

Written Opinion of the International Searching Authority in International Application No. PCT/CN2023/076440, mailed Mar. 22, 2023 with English translation provided by WIPO.

* cited by examiner

GOODS DELIVERY METHOD AND APPARATUS, AND SERVER

CROSS-REFERENCE TO RELATED APPLICATIONS

This application is a continuation of International Patent Application No. PCT/CN2023/076440 filed on Feb. 16, 2023, which claims priority to Chinese Patent Application No. 202210252695.7, filed with the China National Intellectual Property Administration on Mar. 15, 2022 and entitled "GOODS DELIVERY METHOD AND APPARATUS, AND DEVICE", the disclosures of which are incorporated herein by reference in their entireties.

TECHNICAL FIELD

The present disclosure relates to the field of intelligent warehousing technologies, and in particular, to a goods delivery method and apparatus, and a device.

BACKGROUND OF THE INVENTION

To ensure production efficiency, production lines have been widely used. To ensure operation efficiency of a production line, a temporary storage warehouse is usually set up next to the production line. The temporary storage warehouse, or referred to as a lineside warehouse, can shorten the distance of delivering goods to the production line.

To improve delivery efficiency, a robot is usually used to complete delivery of the goods. In the prior art, a single-bin robot is usually used for delivery.

However, when a plurality of production lines require goods or goods are required at different locations of a same production line, the single-bin robot needs to repeatedly travel between delivery points and retrieve points, resulting in low delivery efficiency.

SUMMARY OF THE INVENTION

The present disclosure provides a goods delivery method and apparatus, and a device, which can control a multi-bin robot to complete delivery of goods in a lineside warehouse, and can optimize a process of delivery by the multi-bin robot, thereby improving delivery efficiency.

According to a first aspect, the present disclosure provides a goods delivery method, including: obtaining delivery requirements of a plurality of delivery points in a delivery task; grouping the plurality of delivery points into at least one delivery point group according to the delivery requirements of the delivery points and a delivery capacity of a robot; determining a target delivery route corresponding to one delivery point group in the at least one delivery point group; and controlling, according to the target delivery route, a first robot to deliver goods corresponding to the one delivery point group in the delivery task to the delivery points in the one delivery point group.

Optionally, the grouping the plurality of delivery points into the at least one delivery point group according to the delivery requirements of the delivery points and the delivery capacity of the robot includes:

- determining whether a saturated delivery point exists in the plurality of delivery points, where a delivery requirement of the saturated delivery point is greater than the delivery capacity of the robot;

- determining, if the saturated delivery point exists, a difference between the delivery requirement of the saturated delivery point and the delivery capacity of the robot as a new delivery requirement of the saturated delivery point; and
- grouping the plurality of delivery points into the at least one delivery point group according to the new delivery requirement of the saturated delivery point, delivery requirements of the plurality of delivery points except the saturated delivery point, and the delivery capacity of the robot.

Optionally, the grouping the plurality of delivery points into the at least one delivery point group according to the new delivery requirement of the saturated delivery point, the delivery requirements of the plurality of delivery points except the saturated delivery point, and the delivery capacity of the robot includes:

- determining whether a sum of the new delivery requirement of the saturated delivery point and the delivery requirements of the plurality of delivery points except the saturated delivery point is greater than the delivery capacity of the robot; and
- grouping, if the sum is greater than the delivery capacity of the robot, the plurality of delivery points into the at least one delivery point group according to the new delivery requirement of the saturated delivery point, the delivery requirements of the plurality of delivery points except the saturated delivery point, and the delivery capacity of the robot.

Optionally, the method further includes:

- determining the plurality of delivery points as one delivery point group if the sum is less than or equal to the delivery capacity of the robot.

Optionally, the grouping the plurality of delivery points into the at least one delivery point group according to the delivery requirements of the delivery points and the delivery capacity of the robot includes:

- obtaining location information of the delivery points;
- selecting a first quantity of delivery points as first cluster centers;
- determining distances between the location information of the delivery points and the first cluster centers;
- clustering all the delivery points according to the distances, to form a first quantity of first delivery point groups;
- determining group delivery requirements of the first delivery point groups according to delivery requirements of delivery points in the first delivery point groups separately; and
- determining the at least one delivery point group according to the group delivery requirements, the delivery capacity of the robot, and the first quantity of first delivery point groups.

Optionally, the determining the at least one delivery point group according to the group delivery requirements, the delivery capacity of the robot, and the first quantity of first delivery point groups includes:

- comparing the group delivery requirements separately with the delivery capacity of the robot; and if all the group delivery requirements are less than or equal to the delivery capacity of the robot, determining the first quantity of first delivery point groups as the at least one delivery point group.

Optionally, the determining the at least one delivery point group according to the group delivery requirements, the delivery capacity of the robot, and the first quantity of first delivery point groups includes:

comparing the group delivery requirements separately with the delivery capacity of the robot; and if at least one group delivery requirement is greater than the delivery capacity of the robot, selecting a second quantity of delivery points as second cluster centers, re-clustering all the delivery points to obtain a second quantity of second delivery point groups, and determining the second quantity of second delivery point groups as the at least one delivery point group, where the second quantity is greater than the first quantity.

Optionally, the determining the at least one delivery point group according to the group delivery requirements, the delivery capacity of the robot, and the first quantity of first delivery point groups includes:

comparing the group delivery requirements separately with the delivery capacity of the robot; and if at least one group delivery requirement is greater than the delivery capacity of the robot, using the delivery point group with a group delivery requirement greater than the delivery capacity of the robot in the first delivery point groups as a third delivery point group, and re-clustering delivery points in the third delivery point group according to location information and delivery requirements of the delivery points in the third delivery point group and the delivery capacity of the robot, to form at least one fourth delivery point group; and determining the fourth delivery point group and the first delivery point groups except the third delivery point group as the at least one delivery point group.

Optionally, before the selecting the first quantity of delivery points as the first cluster centers, the method further includes:

determining a total delivery requirement of all the delivery points according to the delivery requirements of the delivery points; and determining the first quantity according to a ratio of the total delivery requirement to the delivery capacity of the robot, where the first quantity is an integer greater than or equal to the ratio.

Optionally, the determining the target delivery route corresponding to the one delivery point group in the at least one delivery point group includes:

obtaining location information of the first robot corresponding to the one delivery point group in the at least one delivery point group; and determining the target delivery route according to location information of the delivery points in the one delivery point group and the location information of the first robot.

Optionally, the determining the target delivery route according to the location information of the delivery points in the one delivery point group and the location information of the first robot includes:

determining a distance matrix corresponding to the one delivery point group, where the distance matrix includes distances between locations of the delivery points in the one delivery point group and the location information of the first robot;

randomly generating an initial route corresponding to the delivery point group according to the distance matrix;

performing iteration on the initial route according to the distance matrix, and stopping the iteration when a preset condition is met; and determining the target delivery route according to an iteration result.

Optionally, the determining the target delivery route corresponding to the one delivery point group in the at least one delivery point group includes:

obtaining the pre-stored target delivery route corresponding to the one delivery point group in the at least one delivery point group.

Optionally, the delivery point group includes P delivery points; and before the obtaining the pre-stored target delivery route corresponding to the one delivery point group in the at least one delivery point group, the method further includes:

determining a first delivery route according to location information of the delivery points in the one delivery point group in the at least one delivery point group and location information of the first robot;

controlling, according to the first delivery route, the first robot to deliver goods corresponding to the delivery task to a $Q^{th}$ delivery point in the delivery point group; and determining and storing the target delivery route according to location information of P-Q delivery points to which delivery has not been completed in the delivery point group and start location information of the first robot.

Optionally, the method further includes:

in the process of controlling, according to the target delivery route, the first robot to deliver the goods corresponding to the delivery task to the delivery points in the delivery point group, determining a second delivery route according to location information of a first delivery point to which delivery has not been completed in the delivery point group and current location information of the first robot; and controlling, according to the second delivery route, the first robot to deliver goods corresponding to the delivery task to the first delivery point to which delivery has not been completed in the delivery point group.

Optionally, before the controlling, according to the target delivery route, the first robot to deliver the goods corresponding to the delivery task to the delivery points in the delivery point group, the method further includes:

determining the first robot from a plurality of robots according to location information of the delivery points in the delivery point group and location information of the plurality of robots, where a distance between the first robot and the delivery point group is less than or equal to a preset value.

Optionally, goods corresponding to the delivery task are located on a conveyor; and before the controlling, according to the target delivery route, the first robot to deliver the goods corresponding to the delivery task to the delivery points in the delivery point group, the method further includes:

determining a delivery sequence of the delivery points in the delivery point group according to the target delivery route;

determining a goods delivery sequence of goods according to the goods required by the delivery points and the delivery sequence; and controlling a second robot to sequentially transfer the goods to the conveyor according to the goods delivery sequence, and controlling the first robot to retrieve the goods from the conveyor.

Optionally, goods corresponding to the delivery task are located on a buffer shelving unit; and before the controlling, according to the target delivery route, the first robot to deliver the goods corresponding to the delivery task to the delivery points in the delivery point group, the method further includes:

determining the goods corresponding to the delivery point group according to the delivery task; and controlling the first robot to retrieve the goods from the buffer shelving unit.

According to a second aspect, the present disclosure provides a goods delivery apparatus, including:

an obtaining module, configured to obtain delivery requirements of a plurality of delivery points in a delivery task; and a processing module, configured to group the plurality of delivery points into at least one delivery point group according to the delivery requirements of the delivery points and a delivery capacity of a robot, where the processing module is further configured to determine a target delivery route corresponding to one delivery point group in the at least one delivery point group; and the processing module is further configured to control, according to the target delivery route, a first robot to deliver goods corresponding to the one delivery point group in the delivery task to the delivery points in the one delivery point group.

According to a third aspect, the present disclosure provides an electronic device, including: at least one processor; and a memory communicatively connected to the at least one processor, where the memory stores instructions executable by the at least one processor, and the instructions are executed by the at least one processor to cause the at least one processor to perform the method according to the first aspect and the optional manners of the first aspect.

According to a fourth aspect, the present disclosure provides a computer-readable storage medium, storing computer-executable instructions, where when executed by a processor, the computer-executable instructions are configured to implement the method according to the first aspect or the optional manners of the first aspect.

According to a fifth aspect, the present disclosure provides a computer program product, including computer programs/instructions, where the computer programs/instructions, when executed by a processor, implement the method according to the first aspect or the optional manners of the first aspect.

In the goods delivery method and apparatus, and the device provided in the present disclosure, delivery requirements of a plurality of delivery points in a delivery task are obtained; the plurality of delivery points are grouped into at least one delivery point group according to the delivery requirements of the delivery points and a delivery capacity of a robot; a target delivery route corresponding to one delivery point group in the at least one delivery point group is determined; and according to the target delivery route, a first robot is controlled to deliver goods corresponding to the one delivery point group in the delivery task to the delivery points in the one delivery point group. In this way, a multi-bin robot can be controlled to complete delivery of goods in a lineside warehouse, and a process of delivery by the multi-bin robot can be optimized, thereby improving delivery efficiency.

BRIEF DESCRIPTION OF DRAWINGS

Accompanying drawings herein are incorporated into and constitute a part of this specification, show embodiments that conform to the present disclosure, and are used together with this specification to describe the principle of the present disclosure.

Figure 1:
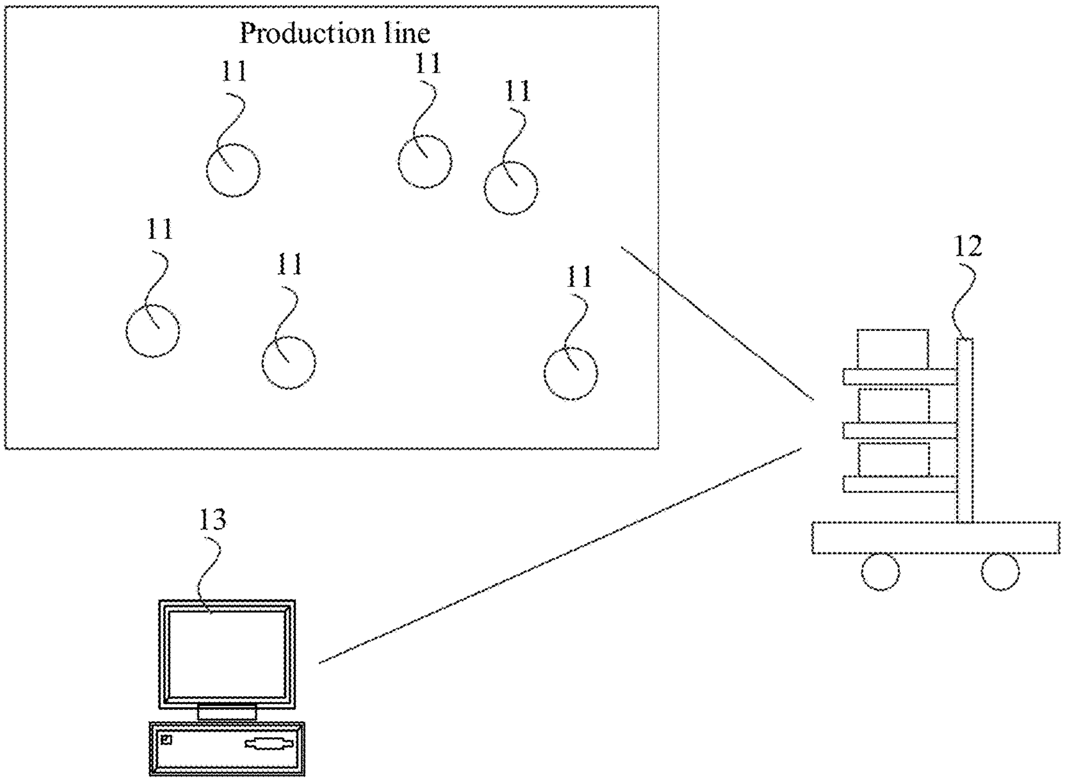
FIG. 1 is a schematic diagram of an application scenario of a goods delivery method according to the present disclosure.

Specific embodiments of the present disclosure have been shown through the foregoing accompanying drawings and will be described in more detail below. These accompanying drawings and text descriptions are not intended to limit the scope of concepts of the present disclosure in any manner, but rather to describe the concepts of the present disclosure for a person skilled in the art by referring to specific embodiments.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The following implementations described in the following exemplary embodiments do not represent all implementations that are consistent with the present disclosure. Instead, they are merely examples of the apparatus and method according to some aspects of the present disclosure as recited in the appended claims.

To ensure production efficiency, production lines have been widely used. To ensure operation efficiency of a production line, a temporary storage warehouse is usually set up next to the production line. The temporary storage warehouse, or referred to as a lineside warehouse, can shorten the distance of delivering goods to the production line. To improve delivery efficiency, a robot is usually used to complete delivery of the goods. In the prior art, a single-bin robot is usually used for delivery. When a plurality of production lines require goods or goods are required at different locations of a same production line, the single-bin robot needs to repeatedly travel between delivery points and retrieve points, resulting in low delivery efficiency. In addition, the probability of interlace operations of robots is high, and the probability of robot collision is high, increasing the difficulty of controlling the robots.

If delivery can be performed for a plurality of delivery points by using a multi-bin robot, the foregoing problems can be solved. However, the multi-bin robot travels among a plurality of different delivery points, and how to ensure delivery efficiency of the robot is a problem that needs to be solved urgently.

Based on this, the present disclosure provides a goods delivery method. First, a plurality of delivery points corresponding to a delivery task are grouped according to delivery requirements of the delivery points and a delivery capacity of a robot, so that a total delivery requirement of each delivery point group matches the delivery capacity of the robot. Then, for each delivery point group, a high-efficiency delivery route is planned or a pre-stored delivery route is obtained, and the robot is controlled to complete a delivery task corresponding to the delivery point group, thereby controlling a multi-bin robot to efficiently complete the delivery task for the plurality of delivery points.

FIG. 1 is a schematic diagram of an application scenario of a goods delivery method according to the present disclosure. The method may be applied to a scenario including a plurality of delivery points 11, a first robot 12, and an electronic device 13.

The electronic device 13 is configured to obtain location information of the plurality of delivery points 11 and delivery requirements of the delivery points 11 in a delivery task; group the plurality of delivery points 11 into at least one delivery point group according to the location information of the delivery points 11, the delivery requirements of the delivery points 11, and a delivery capacity of a robot; determine a target delivery route corresponding to one delivery point group in the at least one delivery point group; and control, according to the target delivery route, the first robot 12 to deliver goods corresponding to the one delivery point group in the delivery task to delivery points 11 in the delivery point group.

The first robot 12 delivers the goods corresponding to the delivery task to the delivery points 11 in the delivery point group according to a received control instruction.

The application scenario of the goods delivery method provided in the present disclosure includes a goods storage area on a side of a production line. The goods storage area may be a buffer shelving unit or a conveyor. It should be understood that, the application scenario of the goods delivery method provided in the present disclosure is not limited to the foregoing case.

The first robot 12 is configured to transfer the goods from the goods storage area to the corresponding delivery points.

Figure 2:
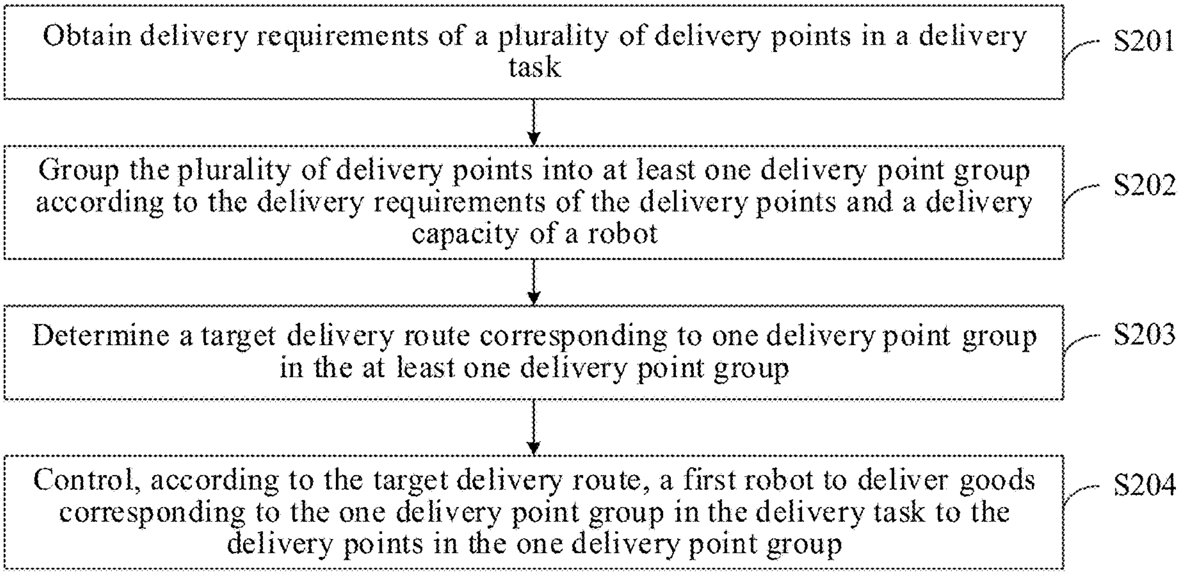
FIG. 2 is a schematic flowchart of a goods delivery method according to the present disclosure.

FIG. 2 is a schematic flowchart of a goods delivery method according to the present disclosure. The method is applied to a control terminal. As shown in FIG. 2, the method includes the following steps.

S201: obtaining delivery requirements of a plurality of delivery points in a delivery task.

The plurality of delivery points are located around a production line. The delivery requirements of the delivery points may be the same or different. The control terminal may parse the received delivery task, to obtain the delivery requirements of the plurality of delivery points in the delivery task; or may receive the delivery requirements of the plurality of delivery points sent by an upper layer device.

A delivery requirement of a delivery point includes information such as a type and a quantity of goods required by the delivery point.

S202: grouping the plurality of delivery points into at least one delivery point group according to the delivery requirements of the delivery points and a delivery capacity of a robot.

The delivery capacity of the robot is a total quantity or a total volume of goods that the robot can transfer once.

A delivery point group may include one or more delivery points. As described below, suitable clustering and grouping are performed on delivery points waiting for delivery according to delivery requirements of the delivery points and the delivery capacity of the robot, and each robot performs delivery to one delivery point group. Further, each robot performs optimal delivery for a delivery task in the group of the robot, for example, may perform delivery according to a shortest distance route. The concept of the delivery point group is used to allocate a multi-bin robot and perform route planning, so that a complex delivery algorithm can be simplified, and higher delivery efficiency can be obtained.

For example, if a delivery requirement of a first delivery point in a plurality of delivery point groups is equal to the delivery capacity of the robot, the first delivery point is determined as one delivery point group; and if a delivery requirement of a second delivery point in the plurality of delivery point groups is greater than the delivery capacity of the robot, at least one delivery point group is determined according to the delivery requirement of the second delivery point, where a total delivery requirement corresponding to each delivery point group is equal to the delivery capacity of the robot, so that a remaining delivery requirement of the second delivery point is less than the delivery capacity of the robot. If a remaining capacity of the second delivery point is 0, a plurality of third delivery points are grouped into at least one delivery point group according to delivery requirements of the plurality of third delivery points in the plurality of delivery point groups and the delivery capacity of the robot, where a total delivery requirement of each delivery point group is less than or equal to the delivery capacity of the robot; and if the remaining capacity of the second delivery point is greater than 0 and less than the delivery capacity of the robot, the second delivery point and the plurality of third delivery points are grouped into at least one delivery point group according to the remaining requirement of the second delivery point, the delivery requirements of the plurality of third delivery points in the plurality of delivery point groups, and the delivery capacity of the robot, where a total delivery requirement of each delivery point group is less than or equal to the delivery capacity of the robot.

Optionally, for delivery points with delivery requirements less than the delivery capacity of the robot or remaining delivery requirements less than the delivery capacity of the robot, clustering and grouping may also be performed on the plurality of delivery points based on location information of the delivery points and a K-means clustering algorithm.

S203: determining a target delivery route corresponding to one delivery point group in the at least one delivery point group.

The target delivery route is a route covering all delivery points in the delivery point group.

The target delivery route may be planned according to locations of the delivery points in the delivery point group and a preset route planning principle, where the preset rule may be the principle of shortest delivery time, the principle of nearest delivery, or the like. The target delivery route may also be obtained from pre-stored delivery routes. Similarly, a target delivery route corresponding to each delivery point group in the at least one delivery point group may be determined.

S204: controlling, according to the target delivery route, a first robot to deliver goods corresponding to the one delivery point group in the delivery task to the delivery points in the one delivery point group.

The first robot is controlled to complete a delivery task for one of the delivery points according to the determined target delivery route, further, the first robot is controlled to complete delivery tasks for the delivery points according to the determined target delivery route.

The first robot is a multi-bin robot.

Optionally, before S204, the method further includes: determining the first robot from a plurality of robots according to location information of the delivery points in the delivery point group and location information of the plurality of robots.

A distance between the first robot and the delivery point group is less than or equal to a preset value.

Through the method, a nearest robot can be selected to complete a delivery task corresponding to a delivery point group, to shorten dispatching distances of robots, reduce the difficulty of dispatching the robots, and reduce interlace operations of the robots, thereby improving delivery efficiency of the robots, and ensuring safety of a process of delivery by the robots.

Optionally, when goods corresponding to the delivery task are located on a conveyor, before S204, the method further includes: determining a delivery sequence of the delivery points in the delivery point group according to the target delivery route; determining a goods delivery sequence of goods according to the goods required by the delivery points and the delivery sequence; and controlling a second robot to sequentially transfer the goods to the conveyor according to the goods delivery sequence, and controlling the first robot to retrieve the goods from the conveyor.

Through the method, goods corresponding to each delivery point group can be continuously placed on the conveyor, to improve retrieving efficiency of the first robot, and reduce unnecessary waiting time, thereby improving delivery efficiency.

Optionally, when goods corresponding to the delivery task are located on a buffer shelving unit, before S204, the method further includes: determining the goods corresponding to the delivery point group according to the delivery task; and controlling the first robot to retrieve the goods from the buffer shelving unit.

When the goods are located on the conveyor, because boxes placed on the conveyor are in a sequence, there are limitations on manners and sequences for transferring boxes in a storage warehouse and placing the boxes, to improve efficiency of transferring the goods to the delivery points by the first robot. In other words, efficiency corresponding to warehouses on two sides affects each other. That is, to improve delivery efficiency, transferring efficiency for some storage warehouses is sacrificed. If the transferring efficiency is maximized, efficiency of a delivery warehouse is further affected. When the goods are located on the buffer shelving unit, the warehouses on the two sides are decoupled. Transferring the goods from the storage warehouse via a bin and transferring the goods by the first robot to the delivery points are almost completely independent, and efficiency of the two can be optimized and is not affected.

Through the method, the robot can accurately retrieve goods corresponding to each delivery point group, thereby improving accuracy of the delivery process.

According to the goods delivery method provided in the present disclosure, delivery requirements of a plurality of delivery points in a delivery task are obtained; the plurality of delivery points are grouped into at least one delivery point group according to the delivery requirements of the delivery points and a delivery capacity of a robot; a target delivery route corresponding to one delivery point group in the at least one delivery point group is determined; and according to the target delivery route, a first robot is controlled to deliver goods corresponding to the one delivery point group in the delivery task to the delivery points in the one delivery point group. In this way, a process of delivery by a multi-bin robot can be optimized, thereby improving delivery efficiency.

Figure 3:
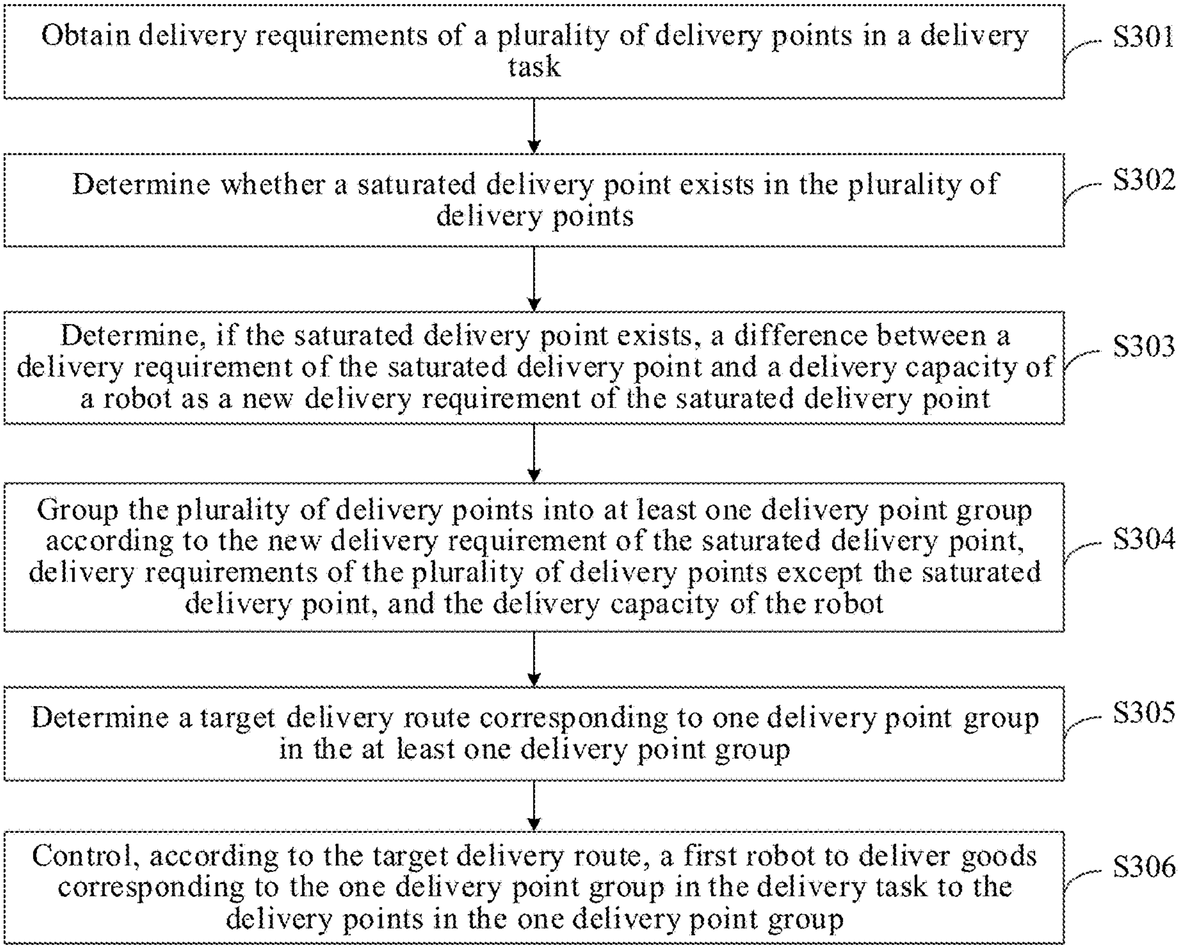
FIG. 3 is a schematic flowchart of another goods delivery method according to the present disclosure.

FIG. 3 is a schematic flowchart of another goods delivery method according to the present disclosure. The method is applied to a control terminal. How to group a plurality of delivery points into at least one delivery point group according to delivery requirements of the delivery points and a delivery capacity of a robot is further described in FIG. 3. As shown in FIG. 3, the method includes:

S301: obtaining the delivery requirements of the plurality of delivery points in a delivery task.

S302: determining whether a saturated delivery point exists in the plurality of delivery points.

A delivery requirement of the saturated delivery point is greater than the delivery capacity of the robot.

The saturated delivery point may be a saturated delivery point of a first type in which a delivery requirement is greater than the delivery capacity of the robot and a ratio of the delivery requirement to the delivery capacity of the robot is an integer; or may be a saturated delivery point of a second type in which a delivery requirement is greater than the delivery capacity of the robot and a ratio of the delivery requirement to the delivery capacity of the robot is not an integer.

S303: determining, if the saturated delivery point exists, a difference between the delivery requirement of the saturated delivery point and the delivery capacity of the robot as a new delivery requirement of the saturated delivery point.

Specifically, if the saturated delivery point is the saturated delivery point of the second type in which the delivery requirement is greater than the delivery capacity of the robot and the ratio of the delivery requirement to the delivery capacity of the robot is not an integer, if the delivery requirement of the saturated delivery point of the second type is greater than N*the delivery capacity of the robot and less than M*the delivery capacity of the robot, a difference between the delivery requirement of the saturated delivery point of the second type and N*the delivery capacity of the robot is determined as the new delivery requirement of the saturated delivery point, where N and M are positive integers.

If the delivery requirement of the saturated delivery point is an integer multiple of the delivery capacity of the robot, it is considered that the new delivery requirement of the saturated delivery point is zero, that is, the saturated delivery point does not need to be added to subsequent delivery point group division.

In the foregoing two cases, when the delivery requirement of the saturated delivery point is the integer multiple of the delivery capacity of the robot, a robot may be individually assigned to perform delivery. In other words, it is not necessary to consider the delivery requirements in subsequent delivery point group division. In an embodiment, a robot may be assigned to perform delivery to the saturated delivery point. In an embodiment, if a delivery requirement of the saturated delivery point is many times the delivery capacity of the robot, a plurality of robots may be assigned to perform delivery to the saturated delivery point.

S304: grouping the plurality of delivery points into the at least one delivery point group according to the new delivery requirement of the saturated delivery point, delivery requirements of the plurality of delivery points except the saturated delivery point, and the delivery capacity of the robot.

In a possible implementation, the grouping the plurality of delivery points into the at least one delivery point group according to the new delivery requirement of the saturated delivery point, the delivery requirements of the plurality of delivery points except the saturated delivery point, and the delivery capacity of the robot includes: determining whether a sum of the new delivery requirement of the saturated delivery point and the delivery requirements of the plurality of delivery points except the saturated delivery point is greater than the delivery capacity of the robot; and grouping, if the sum is greater than the delivery capacity of the robot, the plurality of delivery points into the at least one delivery point group according to the new delivery requirement of the saturated delivery point, the delivery requirements of the plurality of delivery points except the saturated delivery point, and the delivery capacity of the robot.

Through the method, it is determined that a total delivery requirement corresponding to each delivery point group is less than or equal to the delivery capacity of the robot, and internal delivery to the entire delivery point group can be completed by one robot, to reduce interlace operations of robots, thereby improving delivery efficiency.

Optionally, the method further includes: determining the plurality of delivery points as one delivery point group if the sum is less than or equal to the delivery capacity of the robot.

Through the method, internal delivery to the determined entire delivery point group can be completed by one robot, to reduce interlace operations of robots, thereby improving delivery efficiency.

S305: determining a target delivery route corresponding to one delivery point group in the at least one delivery point group.

S306: controlling, according to the target delivery route, a first robot to deliver goods corresponding to the one delivery point group in the delivery task to the delivery points in the one delivery point group.

S305 and S306 have the same technical features as S203 and S204. For detailed descriptions, refer to S203 and S204. Details are not described herein again.

According to the goods delivery method provided in the present disclosure, based on the foregoing embodiments, it is determined whether a saturated delivery point exists in a plurality of delivery points, where a delivery requirement of the saturated delivery point is greater than a delivery capacity of a robot; if the saturated delivery point exists, a difference between the delivery requirement of the saturated delivery point and the delivery capacity of the robot is determined as a new delivery requirement of the saturated delivery point; and the plurality of delivery points is grouped into at least one delivery point group according to the new delivery requirement of the saturated delivery point, delivery requirements of the plurality of delivery points except the saturated delivery point, and the delivery capacity of the robot. In this way, different grouping methods are performed on delivery points with different magnitudes of delivery requirements, so that a grouping case is reasonable.

Figure 4:
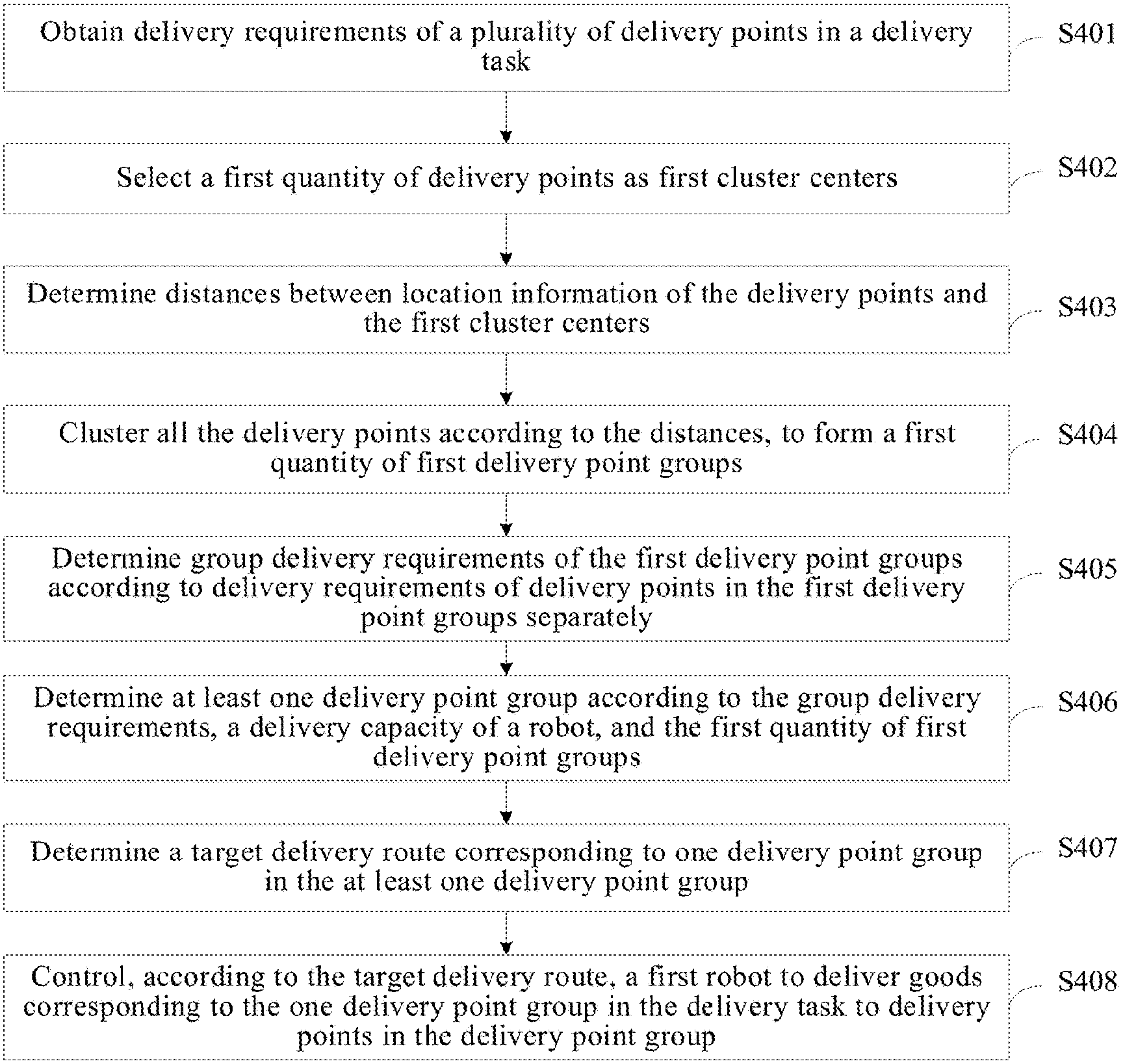
FIG. 4 is a schematic flowchart of still another goods delivery method according to the present disclosure.

FIG. 4 is a schematic flowchart of another goods delivery method according to the present disclosure. The method is applied to a control terminal. How to group a plurality of delivery points into at least one delivery point group according to delivery requirements of the delivery points and a delivery capacity of a robot is further described in FIG. 4. The embodiment shown in FIG. 4 may be combined with any of the foregoing method embodiments, and is shown based on FIG. 2 to save space. As shown in FIG. 4, the method includes:

S401: obtaining the delivery requirements of the plurality of delivery points in a delivery task.

S401 has the same technical features as S201. For a detailed description, refer to S201. Details are not described herein again.

Optionally, before S402, the method further includes: determining a total delivery requirement of all the delivery points according to the delivery requirements of the delivery points; and determining the first quantity according to a ratio of the total delivery requirement to the delivery capacity of the robot.

The first quantity is an integer greater than or equal to the ratio.

Through the method, the reasonable grouping quantity can be determined, and the quantity of times of iteration of a grouping process can be reduced, thereby optimizing the grouping process, and improving grouping efficiency.

S402: selecting a first quantity of delivery points as first cluster centers.

Optionally, the first quantity of delivery points are randomly selected as the first cluster centers. Alternatively, the first quantity of delivery points may be selected according to a preset principle, for example, the first quantity of delivery points are selected according to the principle that the first cluster centers are dispersed as much as possible.

The first quantity may be calculated according to delivery requirements and the delivery capacity of the robot, or may be a randomly set positive integer.

The first cluster centers are initial cluster centers of a K-means clustering algorithm.

S403: determining distances between location information of the delivery points and the first cluster centers.

Specifically, Euclidean distances between the location information of the delivery points and the first cluster centers are determined.

S404: clustering all the delivery points according to the distances, to form a first quantity of first delivery point groups.

Specifically, all the delivery points are clustered by using the K-means clustering algorithm according to the distances.

S402 to S404 are described in detail below by using an example.

First, K delivery points are selected as initial cluster centers of the K-means clustering algorithm. For example, the first quantity of delivery points are selected according to the principle that the first cluster centers are dispersed as much as possible. To be specific, first, one point is randomly selected as a first cluster center $\mu_1$ from an input delivery point location information set; a distance between each delivery point $x_i$ and the selected cluster center is calculated, that is, $D(x_i)=\operatorname{argmin}\|x_i-\mu_1\|$; and a new delivery point is then selected as a new cluster center, where the principle of selection is as follows: a point with a greater distance from the selected cluster center, that is, a point with greater $D(x)$, has a higher probability of being selected as a cluster center. The steps are repeated until the K cluster centers are selected. Then, the cluster centers are updated through iteration until the quantity of times of iteration reaches a preset threshold; and in this case, the iteration is exited, and a clustering result is used as a final clustering and grouping result. Alternatively, the cluster centers may be updated through iteration until a clustering and grouping effect is not improved; and in this case, the iteration is exited, and a clustering result is used as a final clustering and grouping result. Alternatively, the cluster centers may be updated through iteration until iteration duration reaches preset duration; and in this case, the iteration is exited, and a clustering result is used as a final clustering and grouping result.

S405: determining group delivery requirements of the first delivery point groups according to delivery requirements of delivery points in the first delivery point groups separately.

Specifically, a sum of delivery requirements corresponding to delivery points in each of the first delivery point groups is determined as a group delivery requirement of each of the first delivery point groups.

S406: determining at least one delivery point group according to the group delivery requirements, the delivery capacity of the robot, and the first quantity of first delivery point groups.

In a possible implementation, the determining the at least one delivery point group according to the group delivery requirements, the delivery capacity of the robot, and the first quantity of first delivery point groups includes: comparing the group delivery requirements separately with the delivery capacity of the robot; and if all the group delivery requirements are less than or equal to the delivery capacity of the robot, determining the first quantity of first delivery point groups as the at least one delivery point group.

In the method, a delivery point group with a group delivery requirement less than or equal to the delivery capacity of the robot can be allocated to one robot to complete. Since delivery points in the delivery point group are concentrated, delivery efficiency can be effectively improved through the method.

In another possible implementation, the determining the at least one delivery point group according to the group delivery requirements, the delivery capacity of the robot, and the first quantity of first delivery point groups includes: comparing the group delivery requirements separately with the delivery capacity of the robot; and if at least one group delivery requirement is greater than the delivery capacity of the robot, selecting a second quantity of delivery points as second cluster centers, re-clustering all the delivery points to obtain a second quantity of second delivery point groups, and determining the second quantity of second delivery point groups as the at least one delivery point group.

The second quantity is greater than the first quantity.

Through the method, when delivery point groups with corresponding group delivery requirements greater than the delivery capacity of the robot exist in delivery point groups obtained through clustering, clustering and grouping can be re-performed on the delivery point groups, so that a group delivery requirement corresponding to each of delivery point groups obtained through grouping can be completed by one robot. In this way, interlace operations of robots can be avoided, thereby improving delivery efficiency of the robots. In the method, clustering and grouping are re-performed on all the delivery points, so that a grouping case can be fully optimized, thereby improving grouping quality.

In still another possible implementation, the determining the at least one delivery point group according to the group delivery requirements, the delivery capacity of the robot, and the first quantity of first delivery point groups includes: comparing the group delivery requirements separately with the delivery capacity of the robot; and if at least one group delivery requirement is greater than the delivery capacity of the robot, using the delivery point group with a group delivery requirement greater than the delivery capacity of the robot in the first delivery point groups as a third delivery point group, and re-clustering delivery points in the third delivery point group according to location information and delivery requirements of the delivery points in the third delivery point group and the delivery capacity of the robot, to form at least one fourth delivery point group; and determining the fourth delivery point group and the first delivery point groups except the third delivery point group as the at least one delivery point group.

Through the method, when delivery point groups with corresponding group delivery requirements greater than the delivery capacity of the robot exist in delivery point groups obtained through clustering, clustering and grouping can be re-performed on delivery points included in the delivery point groups with group delivery requirements greater than the delivery capacity of the robot, so that a group delivery requirement corresponding to each of finally obtained delivery point groups can be less than or equal to the delivery capacity of the robot, to be completed by one robot. In this way, interlace operations of robots can be avoided, thereby improving delivery efficiency of the robots. In the method, clustering and grouping are re-performed on only delivery points in a delivery point group with a group delivery requirement greater than the delivery capacity of the robot, so that the amount of calculation data can be reduced, thereby improving clustering and grouping efficiency.

S407: determining a target delivery route corresponding to one delivery point group in the at least one delivery point group.

S408: controlling, according to the target delivery route, a first robot to deliver goods corresponding to the one delivery point group in the delivery task to the delivery points in the delivery point group.

S407 and S408 have the same technical features as S203 and S204. For detailed descriptions, refer to S203 and S204. Details are not described herein again.

Optionally, the method further includes:

- in the process of controlling, according to the target delivery route, the first robot to deliver the goods corresponding to the delivery task to the delivery points in the delivery point group, determining a second delivery route according to location information of a first delivery point to which delivery has not been completed in the delivery point group and current location information of the first robot; and controlling, according to the second delivery route, the first robot to deliver goods corresponding to the delivery task to the first delivery point to which delivery has not been completed in the delivery point group.

Through the method, during delivery by the robot, a delivery route of the robot can be continuously optimized and updated according to a current location of the robot and location information of a delivery point to which the robot does not complete delivery, thereby further improving delivery efficiency.

Optionally, the method further includes:

- in the process of controlling, according to the target delivery route, the first robot to deliver the goods corresponding to the delivery task to the delivery points in the delivery point group, determining and storing a second delivery route according to location information of a first delivery point to which delivery has not been completed in the delivery point group and current location information of the first robot.

The second delivery route is used for controlling the first robot to deliver the goods corresponding to the delivery task to the delivery points in the delivery point group according to the second delivery route when the robot needs to complete the same delivery task next time.

Through the method, when the robot needs the task same as the current task next time, the robot can obtain an optimal delivery route without performing a responsible calculation process, so that the calculation process can be reduced, thereby effectively improving delivery efficiency.

In the goods delivery method provided in the present disclosure, based on the foregoing embodiments, further, the first quantity of delivery points are selected as first cluster centers; distances between location information of the delivery points and the first cluster centers are determined; all the delivery points are clustered according to the distances, to form a first quantity of first delivery point groups; group delivery requirements of the first delivery point groups are determined according to delivery requirements of delivery points in the first delivery point groups separately; and at least one delivery point group is determined according to the group delivery requirements, a delivery capacity of a robot, and the first quantity of first delivery point groups. In this way, clustering and grouping can be performed on delivery points, and it can be ensured that delivery requirements match the delivery capacity of the robot. In this way, a group delivery requirement corresponding to one delivery point group can be completed by as few robots as possible, thereby avoiding interlace operations of robots, reducing the difficulty of controlling the robots, and improving utilization of the robots. Further, Through the method, delivery points included in each delivery point group can be concentrated as much as possible, thereby reducing an operation range of a robot, improving operation efficiency of the robot, and improving delivery efficiency.

Figure 5:
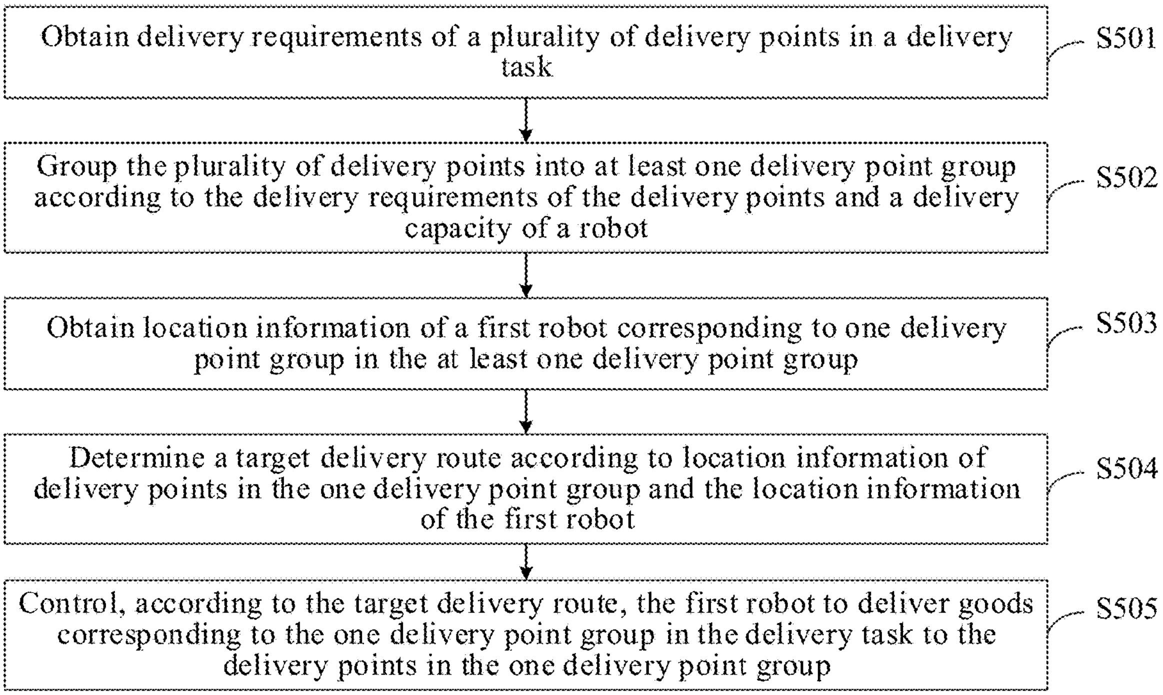
FIG. 5 is a schematic flowchart of yet another goods delivery method according to the present disclosure.

FIG. 5 is a schematic flowchart of still another goods delivery method according to the present disclosure. The method is applied to a control terminal. How to determine a target delivery route corresponding to a delivery point group is further described in FIG. 5 based on any of the foregoing method embodiments, and is described herein in detail based on FIG. 2. As shown in FIG. 5, the method includes:

S501: obtaining delivery requirements of a plurality of delivery points in a delivery task.

S502: grouping the plurality of delivery points into at least one delivery point group according to the delivery requirements of the delivery points and a delivery capacity of a robot.

S501 and S502 have the same technical features as S201 and S202. For detailed descriptions, refer to S201 and S202. Details are not described herein again.

S503: obtaining location information of a first robot corresponding to one delivery point group in the at least one delivery point group.

Specifically, the first robot is configured to complete a delivery task corresponding to the delivery point group.

For example, the location information of the first robot may be obtained from another device, such as a dispatching system; or the location information of the first robot may be obtained according to interaction with the first robot and location information reported by the robot.

S504: determining a target delivery route according to location information of delivery points in the one delivery point group and the location information of the first robot.

For example, the target delivery route may be determined according to the principle of nearest delivery and distances between the location information of the delivery points and the location information of the first robot. The target delivery route may alternatively be determined by using a heuristic algorithm.

In a possible implementation, the determining the target delivery route according to the location information of the delivery points and the location information of the first robot includes: determining a distance matrix corresponding to the delivery point group, where the distance matrix includes distances between locations of the delivery points in the delivery point group and the location information of the first robot; randomly generating an initial route corresponding to the delivery point group according to the distance matrix; performing iteration on the initial route according to the distance matrix, and stopping the iteration when a preset condition is met, where the preset condition includes at least one of the following: iteration duration reaches preset duration, the quantity of times of iteration reaches the preset quantity of times, or optimization degrees of M consecutive iteration results starting from an $N^{th}$ time of iteration are less than or equal to a preset threshold, where both N and M are positive integers; and determining the target delivery route according to an iteration result.

Through the method, a reasonable delivery route can be determined at a fast speed, and a processing process is shortened, thereby further improving delivery efficiency of the robot.

S505: controlling, according to the target delivery route, the first robot to deliver goods corresponding to the one delivery point group in the delivery task to the delivery points in the one delivery point group.

S505 has the same technical features as S204. For a detailed description, refer to S204. Details are not described herein again.

In the goods delivery method provided in the present disclosure, based on any of the foregoing method embodiments, further, location information of a first robot corresponding to one delivery point in at least one delivery point group is obtained, and a target delivery route is determined according to location information of delivery points in the one delivery point group and the location information of the first robot. In this way, a delivery route can be determined combined with the location information of the robot and location information of delivery points, thereby ensuring rationality of the delivery route, and improving delivery efficiency of the robot.

Figure 6:
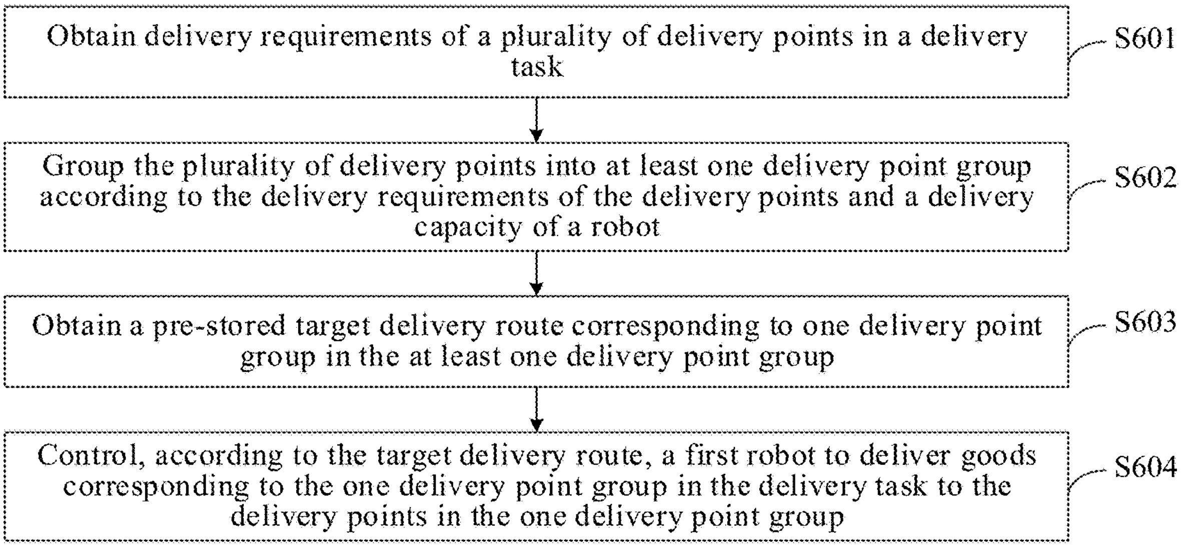
FIG. 6 is a schematic flowchart of yet another goods delivery method according to the present disclosure.

FIG. 6 is a schematic flowchart of yet another goods delivery method according to the present disclosure. The method is applied to a control terminal. How to determine a target delivery route corresponding to a delivery point group is further described in FIG. 6 based on embodiments shown in FIG. 2 to FIG. 4, and is described herein in detail based on FIG. 2. As shown in FIG. 6, the method includes:

S601: obtaining delivery requirements of a plurality of delivery points in a delivery task.

S602: grouping the plurality of delivery points into at least one delivery point group according to the delivery requirements of the delivery points and a delivery capacity of a robot.

S601 and S602 have the same technical features as S201 and S202. For detailed descriptions, refer to S201 and S202. Details are not described herein again.

S603: obtaining a pre-stored target delivery route corresponding to one delivery point group in the at least one delivery point group.

For example, the pre-stored target delivery route corresponding to the delivery point group is obtained from an entity or a virtual storage medium, or the pre-stored target delivery route corresponding to the delivery point group is obtained through communication with another device.

Optionally, the delivery point group includes P delivery points, and before the obtaining the pre-stored target delivery route corresponding to the delivery point group, the method further includes: determining a first delivery route according to location information of delivery points in the delivery point group and location information of a first robot; controlling, according to the first delivery route, the first robot to deliver goods corresponding to the delivery task to a $Q^{th}$ delivery point in the delivery point group; and determining and storing the target delivery route according to location information of P-Q delivery points to which delivery has not been completed in the delivery point group and start location information of the first robot.

The $Q^{th}$ delivery point is a corresponding $Q^{th}$ delivery point in a delivery sequence of the first delivery route.

For example, the delivery point group includes ten delivery points. After the first robot is controlled to complete delivery to a first delivery point according to the first delivery route, delivery has not been completed to remaining nine delivery points in the delivery point group. In this case, a sub-delivery route covering the remaining nine delivery points to which delivery has not been completed is determined according to current location information of the first robot and location information of the remaining nine delivery points to which delivery has not been completed, and a route obtained by combining an actual delivery route of the first robot from a start location to the first delivery point and the sub-delivery route is determined as the target delivery route.

It should be noted that, within an allowed error range, after the first robot completes delivery to the first delivery point, the current location of the first robot may be a location of the first delivery point. Certainly, after the first robot completes delivery to the first delivery point, the current location of the first robot may also be an actual location of the first robot.

Optionally, a corresponding route covering the remaining nine delivery points to which delivery has not been completed in the first delivery route may also be compared with the determined sub-delivery route; if the sub-delivery route is optimal, the route obtained by combining the actual delivery route from the start location of the first robot to the first delivery point and the sub-delivery route is determined as the target delivery route; and if the corresponding route covering the remaining nine delivery points to which delivery has not been completed in the first delivery route is optimal, the first delivery route is determined as the target delivery route. Specifically, it may be determined whether a route is good or poor according to rules such as a route length and delivery duration.

Through the method, a more reasonable delivery route can be pre-determined combined with an actual previously performed delivery process, thereby further optimizing the delivery process, and improving delivery efficiency.

S604: controlling, according to the target delivery route, the first robot to deliver goods corresponding to the one delivery point group in the delivery task to the delivery points in the one delivery point group.

S604 has the same technical features as S204. For a detailed description, refer to S204. Details are not described herein again.

In the goods delivery method provided in the present disclosure, based on the foregoing method embodiments, further, a pre-stored target delivery route corresponding to one delivery point group in at least one delivery point group is obtained, so that a processing process can be simplified, and a response speed of a delivery task can be improved, thereby improving delivery efficiency.

It should be noted that, the foregoing method embodiments may be combined with each other, and a combination form thereof also falls within the scope of the present disclosure.

Figure 7:
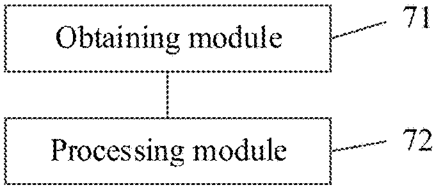
FIG. 7 is a schematic structural diagram of a goods delivery apparatus according to the present disclosure.

FIG. 7 is a schematic structural diagram of a goods delivery apparatus according to the present disclosure. As shown in FIG. 7, the apparatus includes:

an obtaining module 71, configured to obtain delivery requirements of a plurality of delivery points in a delivery task; and a processing module 72, configured to group the plurality of delivery points into at least one delivery point group according to the delivery requirements of the delivery points and a delivery capacity of a robot, where the processing module 72 is further configured to determine a target delivery route corresponding to one delivery point group in the at least one delivery point group; and the processing module 72 is further configured to control, according to the target delivery route, a first robot to deliver goods corresponding to the one delivery point group in the delivery task to the delivery points in the one delivery point group.

Optionally, the processing module 72 is further configured to determine whether a saturated delivery point exists in the plurality of delivery points, where a delivery requirement of the saturated delivery point is greater than the delivery capacity of the robot; determine, if the saturated delivery point exists, a difference between the delivery requirement of the saturated delivery point and the delivery capacity of the robot as a new delivery requirement of the saturated delivery point; and group the plurality of delivery points into at least one delivery point group according to the new delivery requirement of the saturated delivery point, delivery requirements of the plurality of delivery points except the saturated delivery point, and the delivery capacity of the robot.

Optionally, the processing module 72 is further configured to determine whether a sum of the new delivery requirement of the saturated delivery point and the delivery requirements of the plurality of delivery points except the saturated delivery point is greater than the delivery capacity of the robot; and group, if the sum is greater than the delivery capacity of the robot, the plurality of delivery points into the at least one delivery point group according to the new delivery requirement of the saturated delivery point, the delivery requirements of the plurality of delivery points except the saturated delivery point, and the delivery capacity of the robot.

Optionally, the processing module 72 is further configured to determine the plurality of delivery points as one delivery point group if the sum is less than or equal to the delivery capacity of the robot.

Optionally, the processing module 72 is further configured to obtain location information of the delivery points; select a first quantity of delivery points as first cluster centers; determine distances between location information of the delivery points and the first cluster centers; cluster all the delivery points according to the distances, to form a first quantity of first delivery point groups; determine group delivery requirements of the first delivery point groups according to delivery requirements of delivery points in the first delivery point groups separately; and determine the at least one delivery point group according to the group delivery requirements, the delivery capacity of the robot, and the first quantity of first delivery point groups.

Optionally, the processing module 72 is further configured to compare the group delivery requirements separately with the delivery capacity of the robot; and if all the group delivery requirements are less than or equal to the delivery capacity of the robot, determine the first quantity of first delivery point groups as the at least one delivery point group.

Optionally, the processing module 72 is further configured to compare the group delivery requirements separately with the delivery capacity of the robot; and if at least one group delivery requirement is greater than the delivery capacity of the robot, select a second quantity of delivery points as second cluster centers, re-cluster all the delivery points to obtain a second quantity of second delivery point groups, and determine the second quantity of second delivery point groups as the at least one delivery point group, where the second quantity is greater than the first quantity.

Optionally, the processing module 72 is further configured to compare the group delivery requirements separately with the delivery capacity of the robot; and if at least one group delivery requirement is greater than the delivery capacity of the robot, use the delivery point group with a group delivery requirement greater than the delivery capacity of the robot in the first delivery point groups as a third delivery point group, and re-cluster delivery points in the third delivery point group according to location information and delivery requirements of the delivery points in the third delivery point group and the delivery capacity of the robot, to form at least one fourth delivery point group; and determine the fourth delivery point group and the first delivery point groups except the third delivery point group as the at least one delivery point group.

Optionally, before the selecting the first quantity of delivery points as the first cluster centers, the processing module 72 is further configured to determine a total delivery requirement of all the delivery points according to the delivery requirements of the delivery points; and determine the first quantity according to a ratio of the total delivery requirement to the delivery capacity of the robot, where the first quantity is an integer greater than or equal to the ratio.

Optionally, the processing module 72 is further configured to obtain location information of the first robot corresponding to the one delivery point group in the at least one delivery point group; and determine the target delivery route according to location information of the delivery points in the one delivery point group and the location information of the first robot.

Optionally, the processing module 72 is further configured to determine a distance matrix corresponding to the one delivery point group, where the distance matrix includes distances between locations of the delivery points in the one delivery point group and the location information of the first robot; randomly generate an initial route corresponding to the delivery point group according to the distance matrix; perform iteration on the initial route according to the distance matrix, and stop the iteration when a preset condition is met; and determine the target delivery route according to an iteration result.

Optionally, the processing module 72 is further configured to obtain the pre-stored target delivery route corresponding to the one delivery point group in the at least one delivery point group.

Optionally, the delivery point group includes P delivery points; and before the obtaining the pre-stored target delivery route corresponding to the one delivery point group in the at least one delivery point group, the processing module 72 is further configured to determine a first delivery route according to location information of the delivery points in the one delivery point group in the at least one delivery point group and location information of the first robot; control, according to the first delivery route, the first robot to deliver goods corresponding to the delivery task to a $Q^{th}$ delivery point in the delivery point group; and determine and store the target delivery route according to location information of P-Q delivery points to which delivery has not been completed in the delivery point group and start location information of the first robot.

Optionally, the processing module 72 is further configured to: in the process of controlling, according to the target delivery route, the first robot to deliver the goods corresponding to the delivery task to the delivery points in the delivery point group, determine a second delivery route according to location information of a first delivery point to which delivery has not been completed in the delivery point group and current location information of the first robot; and control, according to the second delivery route, the first robot to deliver goods corresponding to the delivery task to the first delivery point to which delivery has not been completed in the delivery point group.

Optionally, the processing module 72 is further configured to determine the first robot from a plurality of robots according to location information of the delivery points in the delivery point group and location information of the plurality of robots, where a distance between the first robot and the delivery point group is less than or equal to a preset value.

Optionally, goods corresponding to the delivery task are located on a conveyor; and the processing module 72 is further configured to determine a delivery sequence of the delivery points in the delivery point group according to the target delivery route; determine a goods delivery sequence of goods according to the goods required by the delivery points and the delivery sequence; and control a second robot to sequentially transfer the goods to the conveyor according to the goods delivery sequence, and control the first robot to retrieve the goods from the conveyor.

Optionally, goods corresponding to the delivery task are located on a buffer shelving unit; and the processing module 72 is further configured to determine the goods corresponding to the delivery point group according to the delivery task; and control the first robot to retrieve the goods from the buffer shelving unit.

The goods delivery apparatus may perform the foregoing goods delivery method. For content and effects thereof, refer to the method embodiments. Details are not described herein again.

Figure 8:
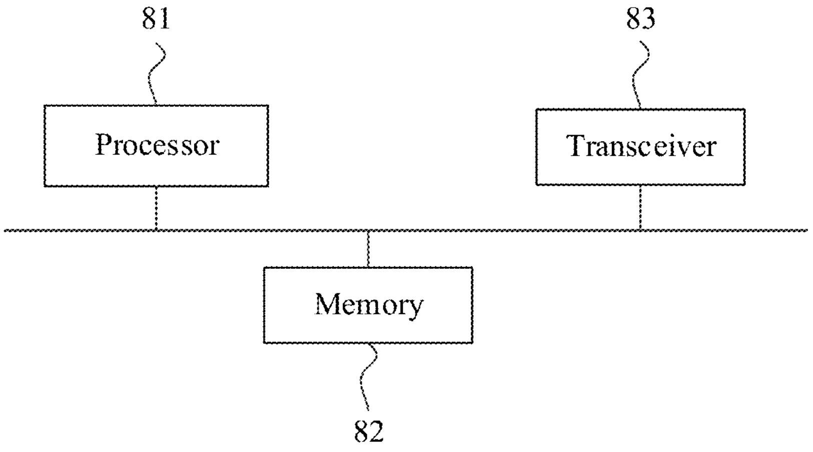
FIG. 8 is a schematic structural diagram of an electronic device according to the present disclosure.

FIG. 8 is a schematic structural diagram of an electronic device according to the present disclosure. As shown in FIG. 8, the electronic device in this embodiment includes a processor 81 and a memory 82, where the processor 81 is communicatively connected to the memory 82, the memory 82 is configured to store a computer program, and the processor 81 is configured to execute the computer program stored in the memory 82, to implement the method according to the foregoing embodiments.

Optionally, the electronic device further includes a transceiver 83, configured to communicate with another device.

The electronic device may perform the foregoing goods delivery method. For content and effects thereof, refer to the method embodiments. Details are not described herein again.

The present disclosure further provides a computer-readable storage medium, storing computer-executable instructions, where when executed by a processor, the computer-executable instructions are configured to implement the method according to any of the foregoing method embodiments.

When the computer-executed instructions stored in the computer-readable storage medium are executed by the processor, the foregoing goods delivery method can be implemented. For content and effects thereof, refer to the method embodiments. Details are not described herein again.

The present disclosure further provides a computer program product, including computer programs/instructions, where the computer programs/instructions, when executed by a processor, implement the method according to any of the foregoing method embodiments.

When the computer-executed instructions stored in the computer-readable storage medium are executed by the processor, the foregoing goods delivery method can be implemented. For content and effects thereof, refer to the method embodiments. Details are not described herein again.

Finally, it should be noted that, the foregoing embodiments are merely used for describing the technical solutions of the present disclosure, but are not intended to limit the present disclosure. It should be understood by a person of ordinary skill in the art that although the present disclosure has been described in detail with reference to the foregoing embodiments, modifications can be made to the technical solutions described in the foregoing embodiments, or equivalent replacements can be made to some or all of the technical features, without departing from the scope of the technical solutions of embodiments of the present disclosure.

The invention claimed is:

1. A goods delivery method, comprising:

obtaining delivery requirements of a plurality of delivery points in a delivery task;

grouping the plurality of delivery points into at least one delivery point group according to the delivery requirements of the delivery points and a delivery capacity of a robot;

determining a target delivery route corresponding to one delivery point group in the at least one delivery point group; and controlling, according to the target delivery route, a first robot to deliver goods corresponding to the one delivery point group in the delivery task to the delivery points in the one delivery point group;

wherein the grouping the plurality of delivery points into the at least one delivery point group according to the delivery requirements of the delivery points and the delivery capacity of the robot comprises:

determining whether a saturated delivery point exists in the plurality of delivery points, wherein a delivery requirement of the saturated delivery point is greater than the delivery capacity of the robot;

determining, if the saturated delivery point exists, a difference between the delivery requirement of the saturated delivery point and the delivery capacity of the robot as a new delivery requirement of the saturated delivery point; and grouping the plurality of delivery points into the at least one delivery point group according to the new delivery requirement of the saturated delivery point, delivery requirements of the plurality of delivery points except the saturated delivery point, and the delivery capacity of the robot.

2. The method according to claim 1, wherein the grouping the plurality of delivery points into the at least one delivery point group according to the new delivery requirement of the saturated delivery point, the delivery requirements of the plurality of delivery points except the saturated delivery point, and the delivery capacity of the robot comprises:

determining whether a sum of the new delivery requirement of the saturated delivery point and the delivery requirements of the plurality of delivery points except the saturated delivery point is greater than the delivery capacity of the robot; and grouping, if the sum is greater than the delivery capacity of the robot, the plurality of delivery points into the at least one delivery point group according to the new delivery requirement of the saturated delivery point, the delivery requirements of the plurality of delivery points except the saturated delivery point, and the delivery capacity of the robot.

3. The method according to claim 2, wherein the method further comprises:

determining the plurality of delivery points as one delivery point group if the sum is less than or equal to the delivery capacity of the robot.

4. The method according to claim 1, wherein the grouping the plurality of delivery points into the at least one delivery point group according to the delivery requirements of the delivery points and the delivery capacity of the robot comprises:

obtaining location information of the delivery points;

selecting a first quantity of delivery points as first cluster centers;

determining distances between the location information of the delivery points and the first cluster centers;

clustering all the delivery points according to the distances, to form a first quantity of first delivery point groups;

determining group delivery requirements of the first delivery point groups according to delivery requirements of delivery points in the first delivery point groups separately; and determining the at least one delivery point group according to the group delivery requirements, the delivery capacity of the robot, and the first quantity of first delivery point groups.

5. The method according to claim 1, wherein the determining the target delivery route corresponding to the one delivery point group in the at least one delivery point group comprises:

obtaining location information of the first robot corresponding to the one delivery point group in the at least one delivery point group; and determining the target delivery route according to location information of the delivery points in the one delivery point group and the location information of the first robot.

6. The method according to claim 5, wherein the determining the target delivery route according to the location information of the delivery points in the one delivery point group and the location information of the first robot comprises:

determining a distance matrix corresponding to the one delivery point group, wherein the distance matrix comprises distances between locations of the delivery points in the one delivery point group and the location information of the first robot;

randomly generating an initial route corresponding to the delivery point group according to the distance matrix;

performing iteration on the initial route according to the distance matrix, and stopping the iteration when a preset condition is met; and determining the target delivery route according to an iteration result.

7. The method according to claim 1, wherein the determining the target delivery route corresponding to the one delivery point group in the at least one delivery point group comprises:

obtaining the pre-stored target delivery route corresponding to the one delivery point group in the at least one delivery point group.

8. The method according to claim 7, wherein the delivery point group comprises P delivery points; and before the obtaining the pre-stored target delivery route corresponding to the one delivery point group in the at least one delivery point group, the method further comprises:

determining a first delivery route according to location information of the delivery points in the one delivery point group in the at least one delivery point group and location information of the first robot;

controlling, according to the first delivery route, the first robot to deliver goods corresponding to the delivery task to a $Q^{th}$ delivery point in the delivery point group; and determining and storing the target delivery route according to location information of P-Q delivery points to which delivery has not been completed in the delivery point group and start location information of the first robot.

9. The method according to claim 1, wherein the method further comprises:

in the process of controlling, according to the target delivery route, the first robot to deliver the goods corresponding to the delivery task to the delivery points in the delivery point group, determining a second delivery route according to location information of a first delivery point to which delivery has not been completed in the delivery point group and current location information of the first robot; and controlling, according to the second delivery route, the first robot to deliver goods corresponding to the delivery task to the first delivery point to which delivery has not been completed in the delivery point group.

10. The method according to claim 1, wherein before the controlling, according to the target delivery route, the first robot to deliver the goods corresponding to the delivery task to the delivery points in the delivery point group, the method further comprises:

determining the first robot from a plurality of robots according to location information of the delivery points in the delivery point group and location information of the plurality of robots, wherein a distance between the first robot and the delivery point group is less than or equal to a preset value.

11. The method according to claim 1, wherein goods corresponding to the delivery task are located on a conveyor; and before the controlling, according to the target delivery route, the first robot to deliver the goods corresponding to the delivery task to the delivery points in the delivery point group, the method further comprises:

determining a delivery sequence of the delivery points in the delivery point group according to the target delivery route;

determining a goods delivery sequence of goods according to the goods required by the delivery points and the delivery sequence; and controlling a second robot to sequentially transfer the goods to the conveyor according to the goods delivery sequence, and controlling the first robot to retrieve the goods from the conveyor.

12. The method according to claim 1, wherein goods corresponding to the delivery task are located on a buffer shelving unit; and before the controlling, according to the target delivery route, the first robot to deliver the goods corresponding to the delivery task to the delivery points in the delivery point group, the method further comprises:

determining the goods corresponding to the delivery point group according to the delivery task; and controlling the first robot to retrieve the goods from the buffer shelving unit.

13. A server, comprising:

at least one processor; and a memory communicatively connected to the at least one processor, wherein the memory stores instructions executable by the at least one processor, and the instructions are executed by the at least one processor to cause the at least one processor to:

obtain delivery requirements of a plurality of delivery points in a delivery task;

group the plurality of delivery points into at least one delivery point group according to the delivery requirements of the delivery points and a delivery capacity of a robot;

determine a target delivery route corresponding to one delivery point group in the at least one delivery point group; and control, according to the target delivery route, a first robot to deliver goods corresponding to the one delivery point group in the delivery task to the delivery points in the one delivery point group;

wherein when the at least one processor is caused to group the plurality of delivery points into the at least one delivery point group, the at least one processor is caused to:

obtain location information of the delivery points;

select a first quantity of delivery points as first cluster centers;

determine distances between the location information of the delivery points and the first cluster centers;

cluster all the delivery points according to the distances, to form a first quantity of first delivery point groups;

determine group delivery requirements of the first delivery point groups according to delivery requirements of delivery points in the first delivery point groups separately; and determine the at least one delivery point group according to the group delivery requirements, the delivery capacity of the robot, and the first quantity of first delivery point groups.

14. A non-transitory computer-readable storage medium storing computer-executable instructions, the computer-executable instructions, when being executed by a processor, are configured to:

obtain delivery requirements of a plurality of delivery points in a delivery task;

group the plurality of delivery points into at least one delivery point group according to the delivery requirements of the delivery points and a delivery capacity of a robot;

determine a target delivery route corresponding to one delivery point group in the at least one delivery point group; and control, according to the target delivery route, a first robot to deliver goods corresponding to the one delivery point group in the delivery task to the delivery points in the one delivery point group;

wherein when the computer-executable instructions are configured to determine the target delivery route corresponding to the one delivery point group in the at least one delivery point group, the computer-executable instructions are further configured to:

obtain location information of the first robot corresponding to the one delivery point group in the at least one delivery point group; and determine the target delivery route according to location information of the delivery points in the one delivery point group and the location information of the first robot;

wherein when the computer-executable instructions are configured to determine the target delivery route according to the location information of the delivery points in the one delivery point group and the location information of the first robot, the computer-executable instructions are configured to:

determine a distance matrix corresponding to the one delivery point group, wherein the distance matrix comprises distances between locations of the delivery points in the one delivery point group and the location information of the first robot;

randomly generate an initial route corresponding to the delivery point group according to the distance matrix;

perform iteration on the initial route according to the distance matrix, and stopping the iteration when a preset condition is met; and determine the target delivery route according to an iteration result.

* * * * *